(12) United States Patent
Mouquet et al.

(10) Patent No.: US 10,560,489 B2
(45) Date of Patent: Feb. 11, 2020

(54) METHOD AND DEVICE FOR PROCESSING A PIECE OF INFORMATION INDICATIVE OF A DESIRE TO BE INVOLVED IN AT LEAST ONE USER APPLICATION SESSION

(71) Applicant: 3G LICENSING S.A., Luxembourg (LU)

(72) Inventors: Antoine Mouquet, Courbevoie (FR); Youssef Chadli, Issy les Moulineaux (FR)

(73) Assignee: 3G LICENSING S.A., Luxembourg (LU)

( * ) Notice: Subject to any disclaimer, the term of this patent is extended or adjusted under 35 U.S.C. 154(b) by 474 days.

(21) Appl. No.: 15/354,611

(22) Filed: Nov. 17, 2016

(65) Prior Publication Data

US 2017/0163692 A1 Jun. 8, 2017

Related U.S. Application Data

(63) Continuation of application No. 13/259,796, filed as application No. PCT/FR2010/050515 on Mar. 22, 2010, now abandoned.

(30) Foreign Application Priority Data

Mar. 24, 2009 (FR) ...................................... 09 51885

(51) Int. Cl.
*H04L 29/06* (2006.01)
*H04L 29/08* (2006.01)

(52) U.S. Cl.
CPC .......... *H04L 65/1006* (2013.01); *H04L 67/26* (2013.01)

(58) Field of Classification Search
USPC ........................................................ 709/228
See application file for complete search history.

(56) References Cited

U.S. PATENT DOCUMENTS

2009/0185522 A1 7/2009 Periyalwar et al.
2009/0210536 A1* 8/2009 Allen ...................... H04M 3/58
709/227

(Continued)

FOREIGN PATENT DOCUMENTS

EP 1330098 A1 7/2003
EP 2129044 A1 2/2009

(Continued)

OTHER PUBLICATIONS

Office Action dated Apr. 19, 2013 for U.S. Appl. No. 13/259,796, filed Sep. 23, 2011.

(Continued)

*Primary Examiner* — Hermon Asres
(74) *Attorney, Agent, or Firm* — David D. Brush; Westman, Champlin & Koehler, P.A.

(57) ABSTRACT

A method and apparatus are provided for processing an item of information indicative of a desire for involvement in at least one application session, established according to the SIP protocol, in progress for a user of a telecommunications network. The at least one session is controlled by a first terminal of the user. The method is implemented by the first controller terminal, and includes receiving a notification of an event relating to the user, which includes at least one item of information indicative of a level of involvement desired by a second terminal of the user, and making a decision relating to the desired level of involvement. In the case of a positive decision, an involvement command is transmitted relating to the level of involvement desired by the second terminal to the telecommunications network.

11 Claims, 10 Drawing Sheets

(56) References Cited

U.S. PATENT DOCUMENTS

| | | | |
|---|---|---|---|
| 2009/0259758 A1 | 10/2009 | Chen et al. | |
| 2009/0287828 A1 | 11/2009 | Wei et al. | |
| 2010/0153576 A1* | 6/2010 | Wohlert | H04N 21/43615 709/231 |
| 2010/0279670 A1* | 11/2010 | Ghai | H04L 65/1083 455/414.3 |

FOREIGN PATENT DOCUMENTS

| | | |
|---|---|---|
| EP | 2086184 A1 | 8/2009 |
| WO | 2008092348 A1 | 8/2008 |
| WO | 2008145026 A1 | 12/2008 |

OTHER PUBLICATIONS

Final Office Action dated Mar. 14, 2014 for U.S. Appl. No. 13/259,796, filed Sep. 23, 2011.
Office Action dated Sep. 3, 2015 for U.S. Appl. No. 13/259,796, filed Sep. 23, 2011.
Final Office Action dated May 17, 2016 for U.S. Appl. No. 13/259,796, filed Sep. 23, 2011.
International Search Report and Written Opinion dated Jul. 6, 2010, from corresponding International Application No. PCT/FR2010/050515, filed Mar. 22, 2010.
English translation of the International Search Report and Written Opinion dated Jun. 7, 2010, from corresponding International Application No. PCT/FR2010/050515, filed Mar. 22, 2010.

* cited by examiner

METHOD AND DEVICE FOR PROCESSING A PIECE OF INFORMATION INDICATIVE OF A DESIRE TO BE INVOLVED IN AT LEAST ONE USER APPLICATION SESSION

CROSS-REFERENCE TO RELATED APPLICATIONS

This application is a continuation of U.S. application Ser. No. 13/259,796, filed Sep. 23, 2011, which is a Section 371 National Stage Application of International Application No. PCT/FR2010/050515, filed Mar. 22, 2010 and published as WO 2010/109,125 on Sep. 30, 2010, not in English, the contents of which are hereby incorporated by reference in their entireties.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of telecommunications networks, and more particularly the interactions between various terminals of a client user of these networks.

The present disclosure relates to a method for processing a desire for involvement of a second terminal in at least one application session in progress for a user on a first terminal.

The disclosure applies in a particularly advantageous manner to IP networks allowing the distribution of audiovisual contents as well as to the field of SIP ("Session Initiation Protocol") session control architectures of IMS type proposed by the 3GPP ("3rd Generation Partnership Project") and TISPAN ("Telecommunications and Internet converged Services and Protocols for Advanced Networking") standardization bodies.

BACKGROUND OF THE DISCLOSURE

IMS is a network architecture introduced by the 3GPP for mobile networks, and then employed by TISPAN for fixed networks. This architecture allows the dynamic establishment and the control of multimedia sessions between two clients as well as the reservation of resources at the media streams transport network level. It also manages the interaction of services.

A client user of an operator's telecommunications network is considered. In the 3GPP standard, this user can use several terminals, fixed or mobile, for one and the same subscription to a service provided by the operator. In 3GPP terminology, a terminal is called UE (User Equipment).

It is assumed that this user has an application session in progress in the telecommunications network. By way of example, he is in communication with an opposite party on one of his terminals UE. Currently, the state of the art in 3GPP allows this user to transfer one or more streams of this communication (when the latter comprises several streams, an audio stream and a video stream for example) over to another UE terminal. Thus, a user who has begun a call on his mobile terminal and who arrives at his office can transfer the voice stream over to his fixed terminal, in a transparent manner, that is to say without interruption for his opposite party.

However, a constraint of the technique currently specified in 3GPP within the framework of application session transfer is that, for a given multimedia session, a single terminal, the so-called "Controller UE" (controller terminal), has control of the service. Stated otherwise, only this controller terminal can initiate the transfer of a media stream to another terminal.

According to the document TR 23.838, when a UE participates in the establishment of a communication, it is the controller of this communication. When this terminal decides, upon a user action, to transfer the communication or one or more streams making up this communication to another terminal, he may decide either to transfer control or to retain it. The terminal may also transfer control of the communication to another terminal, the so-called target terminal, without transferring any stream.

The user cannot request a transfer by interacting with a terminal other than the controller terminal. Thus, in the previous example, the transfer may be requested by the user by interacting with his mobile telephone (which is then controller), but not by pressing a key of the fixed telephone.

However, situations exist where it would be preferable for the user to be able to control the session transfer from the target terminal. The case is considered, for example, of a user who has received a link to a video clip on his mobile terminal. He is in the process of viewing this clip when he returns home. It is assumed that members of the user's family join him to view it. But before the end of the clip, the user receives an important call on his mobile terminal. He takes the call immediately. However, the other members of his family would like to continue to view the clip. However, it is not possible to do so from a terminal other than the controller mobile terminal controlling the application session in progress.

SUMMARY

An aspect of the disclosure relates to a method for processing an item of information indicative of a desire for involvement in at least one application session, established according to the SIP protocol, in progress for a user of a telecommunications network, said at least one session being controlled by a first terminal of said user.

According to an embodiment of the invention, said method, implemented by the first controller terminal, comprises the following steps:

reception of a notification of an event relating to a state of said user, comprising at least one item of information indicative of a level of involvement desired by a second terminal of said user;

decision making relating to the desired level of involvement; and in the case of positive decision, dispatching of an involvement command relating to said level of involvement desired by the second terminal to the telecommunications network.

An embodiment of the invention thus allows a user of a public telecommunications network of an operator to express his desire for involvement in an application session in progress, directly from the terminal on which he desires to receive the transferred media stream. According to an embodiment of the invention, he does not need to send an explicit request for involvement to the network, but only to make known his intentions which will be notified at least to the controller terminal controlling the session in progress.

Indeed, an embodiment of the invention relies on an extension of a user-related event subscription/notification mechanism, which makes it possible to notify the controller terminal controlling the session in progress of a change relating to a state of the user on another terminal, and in particular of a change relating to a desire for involvement of this other terminal of the user in the session in progress.

The controller terminal takes cognizance of the new intentions of the other user terminal, by receiving a notification of an event relating to a state of the user on this other terminal. It then decides whether it is possible to satisfy the desire for involvement expressed by the other terminal as a function of predetermined criteria. It is understood that it may decide to refuse, partially satisfy or completely satisfy the indirect request of the user's other terminal. Once its decision has been taken, it implements the action corresponding to its decision, by dispatching a suitable command to the network.

An embodiment of the invention thus proposes a novel and inventive approach for solving the problem of the consideration by the network of a desire for involvement in a session in progress of a user terminal which is not the controller terminal controlling the application session in progress, such as defined in the IMS architecture.

According to a first aspect of an embodiment of the invention, said item of information indicative of a desire for involvement relates to a desire to be the target of a transfer of at least one type of media stream. It is understood that the requesting terminal desires to receive all or some of the media streams exchanged during the application session. By way of example, a television terminal could notify its desire for involvement by having a video stream transferred to it, whilst the audio stream would be requested by another more suitable terminal of the user, for example a hifi system.

According to a second aspect of an embodiment of the invention, said item of information indicative of a desire for involvement in a session relates to a desire to take control of the session. By way of example, when a user returns home and requests the transfer of the streams of a session in progress on his mobile terminal to at least one fixed terminal, he may desire to control the session from this fixed terminal.

Of course these two types of desire can be aggregated in the same event notification.

According to a first embodiment of the invention, subsequent to the prior subscription to a mechanism for notification of an event relating to a state of the user by the first terminal with a presence server of the telecommunications network, the event notification is received from said presence server. A first advantage of this solution is to benefit from the presence mechanism specified in the document RFC 3856 when it is already put in place for other services, such as the discovery of other users registered in the network or an instant messaging service. A second advantage is that it envisages a notification of the various terminals of one and the same user by the network, thereby making it possible not to increase the complexity of processing at the level of the terminals. The terminals of the user publish, at the presence server, information relating to a state of the user in the network. According to an embodiment of the invention, the second terminal publishes in particular an item of information indicative of a desire for involvement in at least one session in progress. This item of information is notified to the terminals which have previously subscribed to the aforementioned notification mechanism with this presence server, able to notify them of any change of state of the user.

According to a second aspect of an embodiment of the invention, subsequent to the subscription to an event notification mechanism with the second terminal, the event notification is received from the second terminal.

The controller terminal of the user subscribes to the aforementioned notification mechanism directly with each of the other terminals of the user which are registered in the network. An advantage of this solution is that it does not require the use of a presence server of the telecommunications network to manage the subscription/notification of events.

It will be noted that the terminals of a user are, according to the specifications of the IMS architecture, obliged to subscribe to a notification mechanism (Reg Event) in respect of a state of registration of a public identity of the user in the network, which allows them to be informed in the case of deregistration of this identity by the network. They are also informed of the identities of the same user's other terminals, registered simultaneously in the network. They can therefore use these identities to subscribe with each of these terminals to the event notification mechanism in respect of a state of the user according to an embodiment of the invention.

An embodiment of the invention also relates to a device for processing an item of information indicative of a desire for involvement in an application session, established according to the SIP protocol, in progress for a user of a telecommunications network, said at least one session being controlled by a first terminal of said user. According to an embodiment of the invention, such a device comprises means for implementing the method for processing a desire for involvement in at least one application session in progress.

An embodiment of the invention also relates to a method of involvement in at least one application session, established according to the SIP protocol, in progress for a user of a telecommunications network, said session being controlled by a first terminal of said user, characterized in that said method, implemented by a second terminal of said user, comprises a step of sending an event notification comprising at least one item of information indicative of a level of involvement desired by the second terminal in said at least one application session.

Such a method is advantageously implemented by the second terminal to make known to the controller terminal its desire to be involved in a session in progress, for example whether or not to become the target of a transfer of at least one type of media stream or to take control of the session.

According to an embodiment of the invention, the second terminal does not need to know the sessions in progress. It simply makes known its desire to be the target of a transfer of a type of media stream and/or of the control of at least one session. When it receives a media stream of the requested type, it is up to it whether to accept it or to refuse it.

According to a first aspect of an embodiment of the invention, said event notification is published at a presence server able to transmit it to terminals of the user having previously subscribed thereto.

It will be noted that the second terminal does not itself need to have previously subscribed with the presence server, in order to publish its presence therewith.

According to a second aspect of an embodiment of the invention, subsequent to the prior reception of a request for subscription to an event notification mechanism by the first terminal with the second terminal, the event notification is dispatched to said first terminal. According to this embodiment of the invention, the second terminal directly notifies the terminals which have subscribed therewith to the notification of an event relating to a state of the user.

According to another aspect of an embodiment of the invention, the method comprises a step of obtaining information comprising a list of identifiers of application sessions in progress between said user and the network and the step of sending an item of information indicative of a level of involvement desired by the second terminal comprises the identifier of the targeted application session. The second terminal is informed of the list of sessions in progress so as to be able to choose the media stream or streams of interest to it from among those which are available and/or at least one particular session of which it desires to take control. It can advantageously obtain it via the extended subscription/notification mechanism according to an embodiment of the invention, either from the presence server, or directly from each terminal, according to embodiment of the invention.

An embodiment of the invention also relates to a device for involvement in at least one application session, established according to the SIP protocol, in progress for a user of a telecommunications network, said session being controlled by a first terminal of said user, the request originating from a second terminal of the user, characterized in that said device comprises means for implementing the method for requesting involvement in an application session.

An embodiment of the invention also relates to a terminal of a user of a telecommunications network, able to control an application session, established according to the SIP protocol, in progress between the user and said telecommunications network, characterized in that it comprises a device for processing an item of information indicative of a desire for involvement of another terminal in at least one application session in progress and a device for involvement of said terminal in at least one application session in progress.

An embodiment of the invention relates furthermore to a presence server in a telecommunications network, comprising means for receiving information relating to a user and published by a second terminal of a user registered in the network, means for storing said information, means for recording a request for subscription to a notification of an event relating to said user originating from at least one first terminal of said user and means of notification of said first terminal of the user, characterized in that said information comprises at least one item of information indicative of a desire for involvement of the second terminal in at least one application session, established according to the SIP protocol, in progress between the first terminal and the telecommunications network.

An embodiment of the invention also relates to a carrier signal bearing an event notification message, said event relating to a state of a user of a telecommunications network, said user possessing a first controller terminal which controls an application session, established according to the SIP protocol, in progress between the user and the network, characterized in that said message is sent by the second terminal and comprises an item of information indicative of a desire for involvement of the second terminal in said application session in progress.

In a particular embodiment, the various steps of the method for processing an item of information indicative of a desire for involvement in an application session in progress are determined by instructions of computer programs.

Consequently, an embodiment of the invention is also aimed at a computer program on an information support, this program being implementable in a routing, reception or transmission device or more generally in a computer, this program comprising instructions suited to the implementation of the steps of a method for processing an item of information indicative of a desire for involvement such as described hereinabove.

This program can use any programming language, and be in the form of source code, object code, or of code intermediate between source code and object code, such as in a partially compiled form, or in any other desirable form.

An embodiment of the invention is also aimed at an information support readable by a computer, and comprising instructions of a computer program such as mentioned hereinabove.

The information support may be any entity or device capable of storing the program. For example, the support can comprise a storage means, such as a ROM, for example a CD ROM or a microelectronic circuit ROM, or else a magnetic recording means, for example a diskette (floppy disk) or a hard disk.

Moreover, the information support may be a transmissible support such as an electrical or optical signal, which may be routed via an electrical or optical cable, by radio or by other means. The program according to an embodiment of the invention may be in particular downloaded from a network of Internet type.

Alternatively, the information support may be an integrated circuit into which the program is incorporated, the circuit being suitable for executing or for being used in the execution of the method in question.

In a particular embodiment, the various steps of the method of involvement in an application session in progress according to an embodiment of the invention are determined by instructions of computer programs.

Consequently, an embodiment of the invention is also aimed at a computer program on an information support, this program being implementable in a routing, reception or transmission device or more generally in a computer, this program comprising instructions suited to the implementation of the steps of a method of involvement such as described hereinabove.

This program can use any programming language, and be in the form of source code, object code, or of code intermediate between source code and object code, such as in a partially compiled form, or in any other desirable form.

An embodiment of the invention is also aimed at an information support readable by a computer, and comprising instructions of a computer program such as mentioned hereinabove.

The information support may be any entity or device capable of storing the program. For example, the support can comprise a storage means, such as a ROM, for example a CD ROM or a microelectronic circuit ROM, or else a magnetic recording means, for example a diskette (floppy disk) or a hard disk.

Moreover, the information support may be a transmissible support such as an electrical or optical signal, which may be routed via an electrical or optical cable, by radio or by other means. The program according to an embodiment of the invention may be in particular downloaded from a network of Internet type.

Alternatively, the information support may be an integrated circuit into which the program is incorporated, the circuit being suitable for executing or for being used in the execution of the method in question.

BRIEF DESCRIPTION OF THE DRAWINGS

Other advantages and characteristics will be more clearly apparent on reading the following description of a particular embodiment of the invention, given by way of simple illustrative and nonlimiting example, and the appended drawings, among which.

DETAILED DESCRIPTION OF ILLUSTRATIVE EMBODIMENTS

Figure 1:
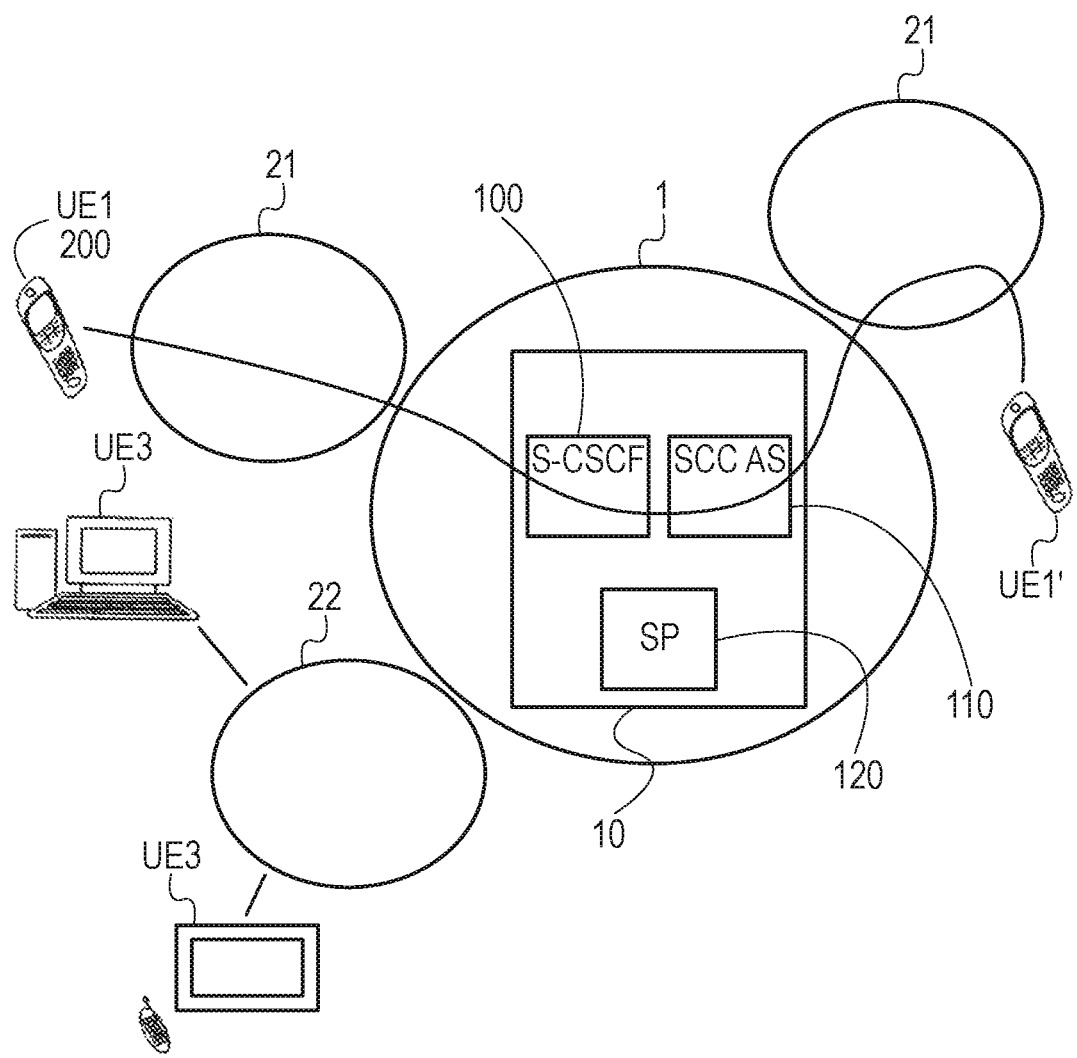
FIG. 1 illustrates in a schematic manner the case of a user having a plurality of terminals registered in a telecommunications network involved in an application session on a first controller terminal controlling the session and desiring to request to be involved in the session, from a second terminal, according to an embodiment of the invention.

In conjunction with FIG. 1, a user A of a telecommunications network 1 is considered. This user A has a plurality of terminals $UE_1$, $UE_2$, $UE_3$ registered in the network. These terminals may be mobile or fixed terminals of varied types, such as for example a television, a PC, a mobile telephone or a fixed telephone, provided that they have an IP connection to the telecommunications network 1. It is assumed that the terminal $UE_1$ is a mobile terminal, such as for example a mobile telephone, personal digital assistant PDA, smartphone, etc and that the terminals $UE_2$ and $UE_3$ are fixed terminals such as, for example, a fixed telephone, a computer PC, a television set and an audio player.

It is assumed that the terminals $UE_1$, $UE_2$ and $UE_3$ access the telecommunications network 1 via access networks 21, 22. The access network 21 is for example a mobile access network of UMTS, GSM, GPRS, UMTS, I-WLAN type, etc. and in this case, the terminal $UE_1$ accesses the telecommunications network 1 via a radio base station or else in the I-WLAN case via a Wifi access point. It is assumed that the access network 22 is a fixed access network of x-DSL, FTTH type, etc. and that the fixed terminals $UE_2$ and $UE_3$ access the network 1 via a residential gateway or a router modem.

It will be noted that the invention is not limited to these examples of access technologies nor of types of terminals and that the invention extends to any other access technology allowing any type of IP terminal to connect to the telecommunications network 1.

It is assumed that the user A has taken out a subscription with the operator of the telecommunications network 1 which allows him to open one or more multimedia sessions with the network 1. The expression multimedia session refers to any continuous communication period during which a user accesses one or more media, such as voice, text, image, video or the like, from a terminal. By way of example, a multimedia session can correspond to a simple telephone conversation, a videocommunication, the broadcasting of an audiovisual program, a conversation by instant messaging, etc. It will be noted that such a multimedia session may involve one or more other users.

The telecommunications network 1 comprises an application system 10 intended to manage the establishment and tracking of all the multimedia sessions relating to the user on his terminal (initiated session or session destined for the user as in the case of an incoming session intended for the user). The application system 10 can for example be a system of the IP Multimedia or IMS ("IP Multimedia Subsystem") sub-domain which is a known standardized architecture for next generation networks NGN ("Next Generation Networking") for the telecommunications operators and which makes it possible to provide fixed and mobile multimedia services. This system relies on various technologies for transporting media streams, including voice over IP ("Internet Protocol") network technology based on a standardized 3GPP ("3rd Generation Partnership Project") implementation of the SIP ("Session Initiation Protocol") signaling protocol operating on an IP standard protocol. The IMS architecture supports existing telephone systems and allows the users to use multimedia services both on the move in an outside environment ("roaming" situation) and from a domestic environment. For this purpose, the IMS architecture uses the IP standard protocols defined by the IETF ("Internet Engineering Task Force").

The architecture of an IMS system, the various entities of such a system, the registration of the equipment of the users with an IMS system as well as the establishment of a multimedia session in an IMS system are in particular described in detail in the documents 3GPP TS 23.228 V8.8.0 (2009-03), 3rd Generation Partnership Project; Technical Specification Group Services and System Aspects; IP Multimedia Subsystem (IMS); Stage 2 (Release 8)>> available at the Web address http://www.3gpp.org/ftp/specs/archive/23_series/23.228/, and <<3GPP TS 24.229 V8.6.0 (2008-12), 3rd Generation Partnership Project; Technical Specification Group Core Network and Terminals; IP multimedia call control protocol based on Session Initiation Protocol (SIP) and Session Description Protocol (SDP); Stage 3 (Release 8)>> available at the Web address http://www.3gpp.org/ftp/Specs/archive/24_series/24.229/. The SIP protocol is described in the document RFC 3261 of the IETF working group (working group on the Internet network or Internet Engineering Task Force), available at the Internet address http://www.ietf.org/rfc.

After connecting to the communication network 1, the user A registers with the application system 10. More precisely, to be able to avail himself of the multimedia services to which the user A has subscribed through his operator, the user A registers at the IMS which is the application system instantiation chosen in this example. Attachment to the IMS is achieved by registering the user via the SIP process "Register" as defined in RFC 3261 specified by the IETF. One of the items of data used as parameter is the public identity of the user which serves to identify this user to the third party users (the user can have several public identities). The registering of the user in the application system 10 allows him to receive, in particular, requests for establishing multimedia sessions initiated by third party users (originating either from a fixed or mobile network) such as a request for establishing a conversational session ("chat") for example.

The case is considered for example where a user has an application session in progress from his mobile terminal with another user of the communication network. It is assumed that the user has sent him a video clip that he has just downloaded and that he now desires to view. As he has just returned home, the user A would like to view the video clip from his television so as to enable other members of his family to benefit therefrom and control the stream transfer with the aid of his television's remote control.

The procedures making it possible to transfer media streams between various terminals of one and the same user, in an IMS network, are described in the document TR 23.838. The orchestration of this service is ensured by a dedicated application server SCC AS 110. This is the application service in charge of service continuity ("Service Centralization and Continuity Application Server" or SCC AS). The IMS architecture is described in TS. 23.228. The detailed use of SIP in the IMS architecture is described in TS 24.229.

Now, as mentioned previously, 3GPP imposes according to TR 23.838 that a single terminal has control of a multimedia session in progress. In the present case, this is the mobile terminal $UE_1$. It is therefore not possible according to the 3GPP standard for the television to request the transfer of the session in progress over to the user's mobile terminal.

An embodiment of the invention allows another terminal of the user A to make known to the controller terminal $UE_1$ the desire thereof to be involved in the session in progress on the controller terminal $UE_1$. It relies on a mechanism for event notification between the terminals of the user. This event notification mechanism may be implemented with the aid of SUBSCRIBE/NOTIFY SIP signaling messages as defined in the document RFC 3265. TR 23.838 describes several solutions based on this mechanism which allow a user's terminals to discover the user's other registered terminals and to ascertain their availability as well as the types of media that they support.

An embodiment of the invention consists in extending this mechanism so as to allow a terminal of the user to indicate to the other terminals of this user his desire to be the target of a transfer of at least one media stream of a session in progress and/or to take control of at least one session. An embodiment of the invention therefore consists in exchanging via the SUBSCRIBE/NOTIFY mechanism information allowing a terminal to indicate its desire to recover either the control of at least one session in progress, or one, several or all the streams of this session, or both control and also one or more streams: A terminal which desires to become the target of a transfer updates the item of information regarding its state with a particular value which signifies that it desires to be the target of a transfer. This particular value may furthermore comprise an indicator specifying whether the terminal wishes to have control of the communication transferred to it, and a list of types of media that it wishes to have transferred to it. It will be noted that it may request only the transfer of control of a session in progress.

In an advantageous manner, an embodiment of the invention furthermore allows a terminal involved in one or more sessions to communicate its involvement to the other terminals. For each communication in which the terminal is involved, the terminal indicates:
   the identifier of the communication,
   for each media stream of the communication in which the terminal is involved, the characteristics of this stream and an identifier of this stream,
   the identity of the remote user with whom the communication is established. If this identity is unavailable or anonymous, the terminal indicates "anonymous identity" or unavailable identity as the case may be,
   whether or not it has control of this communication.

In a variant, this item of information is provided only by the terminals having control of a communication. In this case, for each communication of which it has control, the terminal indicates:
   the identifier of the session,
   for each media stream of the session, the characteristics of this stream, an identifier of this stream and the identity of the terminal which carries this stream,
   the identity of the remote user with whom the session has been established. If this identity is unavailable or anonymous, the terminal indicates "anonymous identity" or unavailable identity as the case may be.

It will be noted that the provision of the information relating to the sessions in progress is optional and is not indispensable to the invention. It is also possible to provide only part of the information mentioned hereinabove.

According to an embodiment of the invention, two cases are therefore possible:
   The terminal which desires to indicate its desire to be the target of a transfer has the information provided by the other terminals via the event notification mechanism (information described at 1.). In this case, the terminal uses this information received to designate the session or one or more media streams that it desires to have transferred to it. The information regarding its state then comprises the following items of information:
      An indicator signifying that it wishes to be the target of a transfer
      The identifier(s) of the session(s) concerned in the transfer
      For each session concerned in the transfer, zero, one or more media stream identifiers, corresponding to the media stream(s) that it wishes to have transferred to it
      For each session concerned in the transfer, indication of whether or not the transfer of the control of this session is requested.
   The terminal has no information relating to the sessions and media streams in progress. In this case, the terminal simply indicates its desire to be the target of a transfer. Its state information then comprises the following items of information:
      An indicator signifying that it wishes to be the target of a transfer
      Zero, one or more types of media that the terminal wishes to have transferred to it
      An indicator indicating whether it wishes control of a session to be transferred to it The event notification mechanism allows the controller terminal controlling the session concerned to be notified immediately thereof, and by combining this item of information with the preferences (configured in the terminal) of the user and other possible parameters, the latter decides to initiate the transfer.

Various solutions are possible for exchanging the information relating to the state of a user or of one of his terminals by using the subscription/notification mechanism. They will be presented in greater detail in the subsequent description.

Figure 2:
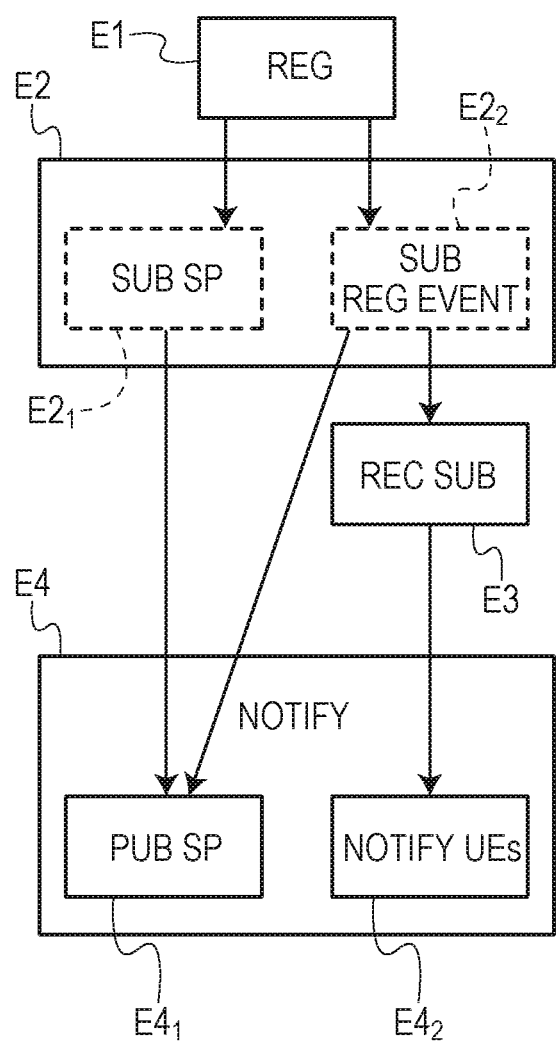
FIG. 2 presents in a schematic manner the method of involvement in an application session in progress according to an embodiment of the invention.

An embodiment of invention therefore relates to a method of involvement in at least one application session in progress, which will now be described in conjunction with FIG. 2. Such a method is advantageously implemented by a terminal of the user A that is not involved in any application session in progress. This is for example the terminal $UE_2$. At E1, the terminal $UE_2$ registers in the IMS with the aid of an SIP Register message, as defined in RFC 3261 of the IETF. In a step $E_2$, it may subscribe optionally to a mechanism for notifying of an event relating to a state of the user A.

At $E_4$, the terminal $UE_2$ sends a notification of an event relating to the presence state of the user A comprising an item of information indicative of a desire to be the target of the transfer of at least one type of media stream of an application session in progress. This notification is addressed to the terminals of the user which have previously subscribed thereto. In this regard, it is necessary for the terminal $UE_1$, the controller of the session in progress, to have fulfilled this condition.

According to a first embodiment of the invention, this subscription/notification mechanism is implemented by way of a presence server SP 120 of the application system 10 of the telecommunications network 1. Such a server is represented in FIG. 1. Step $E2_1$ then consists, as far as the terminal $UE_2$ is concerned, in subscribing to the mechanism for notification of the presence state of the public identity associated with the user A implemented by the presence server SP according to an embodiment of the invention. If several public identities of this user are registered for a user terminal UE, the default identity of this user must be used, as specified in TS 24.229. The procedures of this subscription are described in RFC 3856.

At $E4_1$, the terminal $UE_2$ publishes the item of information ICT indicative of a desired level of involvement in an application session in progress at the presence server SP 120, which will notify those terminals of it which have subscribed to the presence state of the terminal $UE_2$.

According to a variant of the first embodiment of the invention, the terminal $UE_2$ subscribes at $E2_1$ to the state of registration of the public identity of the user A with an entity 100 of S-CSCF (Serving-Call Session Control Function) type according to the mechanism of the package reg event described in RFC 3680 and in the document draft-ietf-sipping-gruu-reg-event. This mechanism allows it to obtain the GRUU URI identities of the user's other registered terminals associated with a public identity of the user A. According to this variant, step $E2_1$ consists, as far as the terminal $UE_2$ is concerned, in subscribing to the presence state of the other terminals of the user A, by specifying their GRUU URI identities that it has previously obtained.

At $E4_1$, the terminal $UE_2$ publishes the item of information ICT at the presence server SP 120, which will notify those terminals of it which have subscribed to the presence state of the user A on the terminal $UE_2$.

According to a second embodiment of the invention, step $E2_2$ of subscription to the reg event notification mechanism is implemented subsequent to the registration step $E_1$. This mechanism allows the terminal $UE_2$ of the user A to obtain the GRUU URI identities of the other terminals registered in the network and associated with a public identity of the user A. In a step $E_3$, the terminal $UE_3$ receives and processes requests for subscription to the notification of events relating to its state originating from other terminals $UE_1$, $UE_2$ of the user A. The other terminals $UE_1$ and $UE_3$ of the user A use the GRUU URI of the terminal $UE_2$ to address their subscription request to it. At $E4_2$, the terminal $UE_2$ directly sends a notification comprising the item of information ICT to the terminals which have subscribed to the events relating to its presence state in the previous step.

It will be noted that in this second embodiment, the invention envisages the definition of a new type of event, notification of which is intended to be performed by way of the SUBSCRIBE/NOTIFY mechanism. This new type of event, that could be called "UE status", relates to at least the item of information ICT indicative of a level of involvement desired by the terminal $UE_3$ in an application session in progress. Such an item of information can for example take the form of an indicator with two values, to indicate whether or not the terminal wishes to be the target of a transfer. It may advantageously be supplemented with the indication of a number of types of media stream desired. It can also comprise an indication of a desire to take control of the session in progress.

Figure 3:
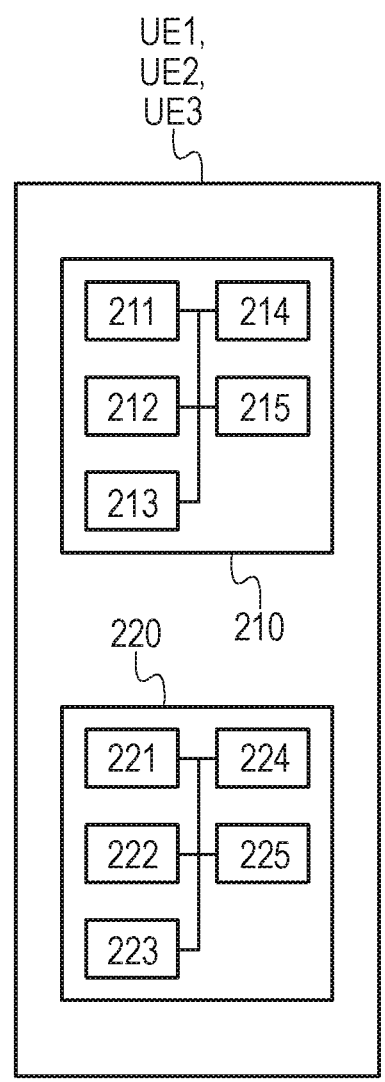
FIG. 3 presents in a schematic manner the structure of a device for involvement in at least one application session according to an embodiment of the invention and the structure of a device for processing an item of information indicative of a desire for involvement in at least one session according to an embodiment of the invention.

According to one embodiment of the invention, the method of requesting transfer of at least one type of media stream is implemented in a device 210 for involvement in a session in progress, which will now be described in conjunction with FIG. 3. It comprises the hardware elements that are routinely found in a conventional computer or a specialized router, namely a processor 211, a random-access memory of RAM type 212, a read-only memory of ROM type 213 and means 214 of telecommunication with the network 1.

In accordance with an embodiment of the invention, the device 210 comprises a memory 215 which constitutes a recording support in accordance with an embodiment of the invention. This support stores the computer program in accordance with an embodiment of the invention. This program comprises instructions for the execution of the steps of the transfer request method, which has just been described with reference to FIG. 2, in accordance with an embodiment of the invention.

In an advantageous manner the device for involvement in a session in progress according to an embodiment of the invention is implemented in a user terminal $UE_3$, $UE_2$, $UE_1$.

Figure 4:
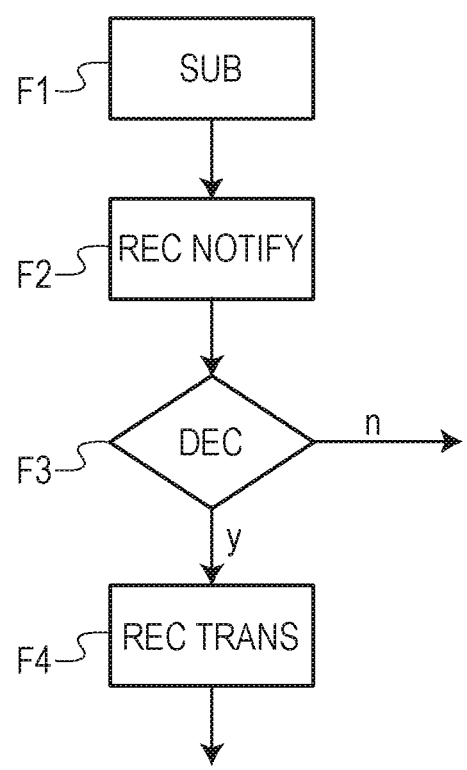
FIG. 4 presents in a schematic manner the method for processing an item of information indicative of a desire for involvement in at least one application session in progress according to an embodiment of the invention.

Once notification of the item of information ICT indicative of a desire for involvement in a session in progress has been effected in the network by the requesting terminal $UE_3$, it is processed according to an embodiment of the invention by the method for processing an item of information indicative of a desire for involvement in a session in progress which will now be described in conjunction with FIG. 4. Such a method is advantageously implemented by the controller terminal $UE_1$.

It is assumed that the terminal $UE_1$ has subscribed at $F_1$ to an event notification mechanism such as those described previously. At $F_2$, it receives an event notification. The latter relates to a state of the user A on the terminal $UE_2$ and comprises the item of information ICT indicative of a desire of the terminal $UE_2$ to be the target of a media stream transfer. It may originate from the presence server SP 120 or directly from the requesting terminal, depending on the notification mechanism used. At $F_3$, the terminal $UE_1$ decides whether such a transfer request must be accepted. According to an embodiment of the invention, several decision criteria may be considered, including among them, in a nonlimiting manner:

the existence of a stream of the requested type; indeed, it may happen that several people, for example the members of one and the same family, use the public identity of one and the same subscriber and that the user of the terminal $UE_3$ has no knowledge of the sessions in progress on the other terminals associated with this public identity;

the configuration of the controller terminal $UE_1$. It may be configured so as to accept or refuse all the transfer requests;

the type of medium or type of session. For example, the controller terminal could refuse the transfer of media streams attached to a particular session, for example a professional session, for confidentiality reasons;

the type of requesting terminal. The controller terminal could partially consent to involve the requesting terminal, granting it media stream transfer only for a predetermined stream type, for example a video stream for a television terminal.

Once the decision has been made, if it is positive, the controller terminal sends at $F_4$ an involvement command to the network 1, for the requesting terminal $UE_2$. By way of example, this may be a request for media stream transfer of the session in progress to the terminal $UE_2$. In an advantageous manner, in the IMS, it is the application server SCC-AS 110 in charge of managing the mobility of the users which processes such a request, as specified in the document TR 23.838.

According to one embodiment of the invention, the method for processing a desire for involvement in an application session is implemented in a device 220 for processing an item of information indicative of a desire for involvement, which will now be described in conjunction with FIG. 3. It comprises the hardware elements that are routinely found in a conventional computer or a specialized router, namely a processor 221, a random-access memory of RAM type 222, a read-only memory of ROM type 223 and means 224 of telecommunication with the network 1.

In accordance with an embodiment of the invention, the device 220 comprises a memory 225 which constitutes a recording support in accordance with an embodiment of the invention. This support stores the computer program in accordance with an embodiment of the invention. This program comprises instructions for the execution of the steps of the method for processing a transfer request, which has just been described with reference to FIG. 4, in accordance with an embodiment of the invention.

In an advantageous manner the device for processing an item of information indicative of a desire for involvement in an application session according to an embodiment of the invention is implemented in a user terminal $UE_3$, $UE_2$, $UE_1$.

Figure 5:
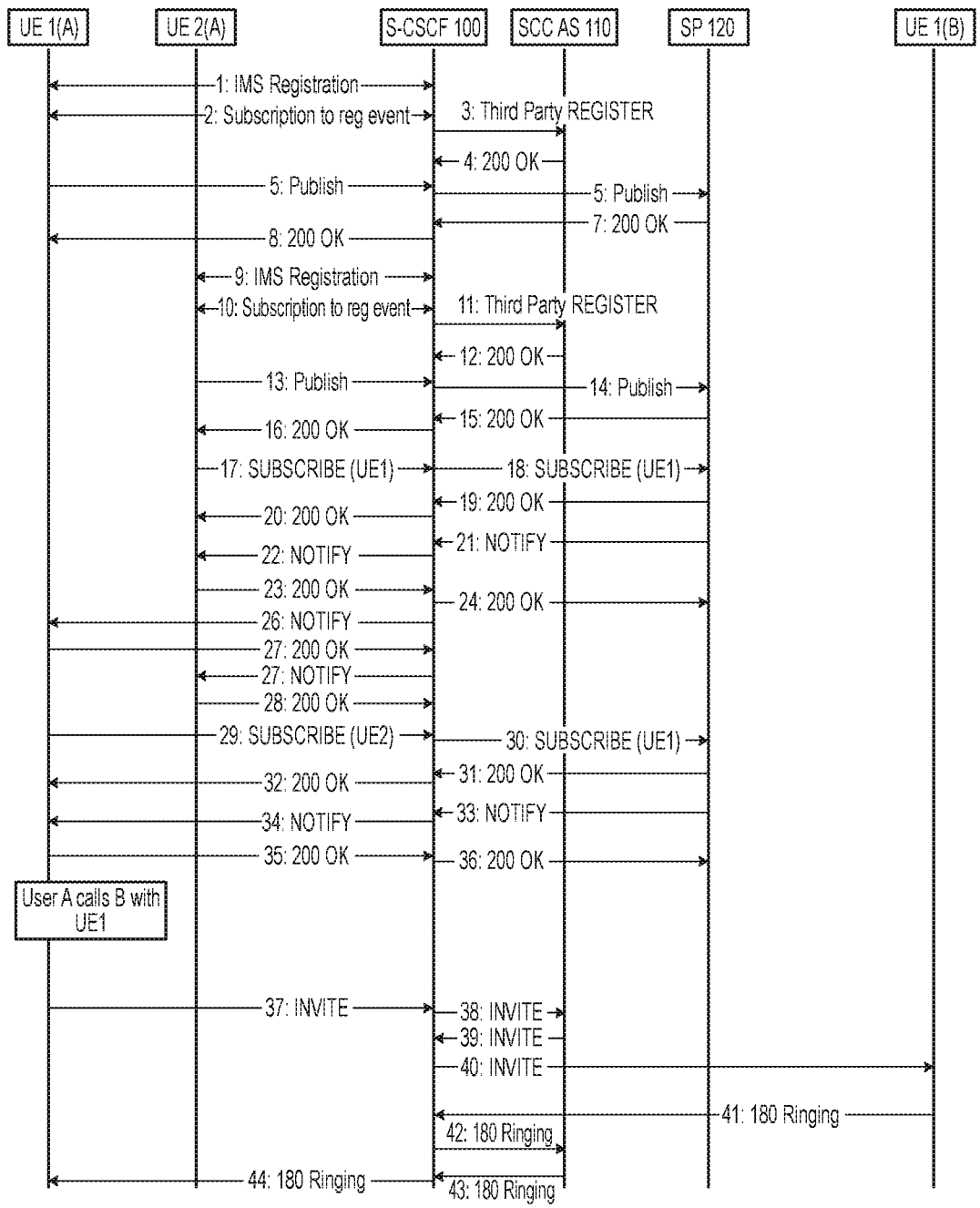
FIGS. 5 and 6 present the diagrams of the streams exchanged between the terminals of a user and the telecommunication network in a first exemplary implementation of the first embodiment of the invention.
Figure 6:
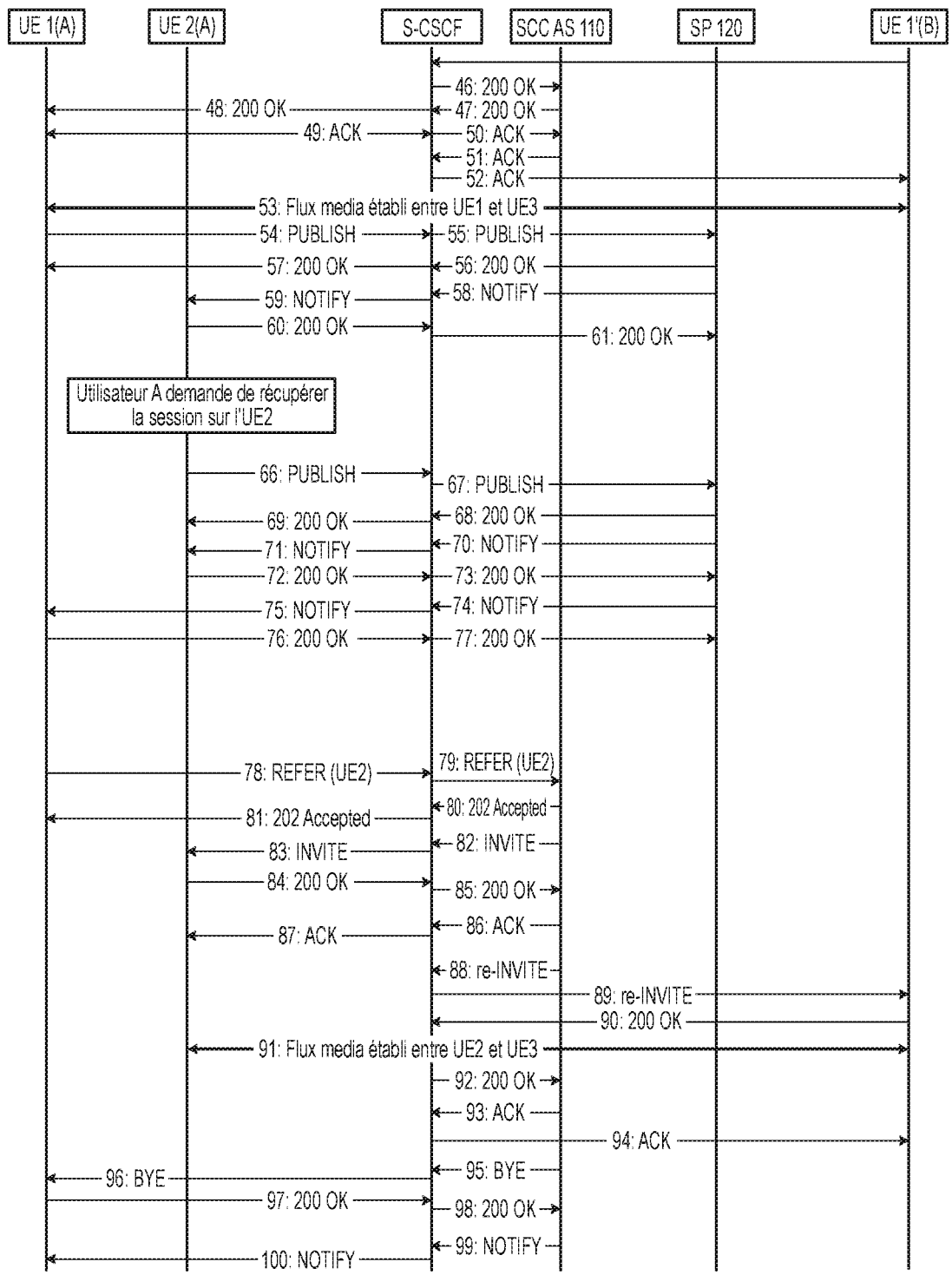

By way of exemplary implementation in an IMS architecture, the signaling messages exchanged between the terminals $UE_1$, $UE_2$ of the user A, the terminal $UE_1'$ of the user B and the telecommunication network 1 according to the first embodiment of the invention will now be described in greater detail in conjunction with the stream diagrams of FIGS. 5 and 6.

The user A has terminals $UE_1$, $UE_2$ and $UE_3$.

By way of reminder, the user A uses his terminal $UE_1$ to call a user B who has the terminal $UE_1'$. A media session is therefore established between the terminals $UE_1$(A) and $UE_1'$(B).

The user A decides to request the transfer of the communication over to his terminal $UE_2$ by acting on the latter.

It will be noted that all the SIP messages exchanged sent or received by the terminals $UE_1$ and $UE_2$ of the user A pass through an entity P-CSCF (Proxy-Call Session Control Function). The same holds for the terminal $UE_1'$ of the user B. For the sake of simplification, these entities P-CSCF are not represented.

It will be noted that SIP entities other than those represented may be situated on the signaling path between the terminal $UE_1'$(B) and the entity S-CSCF. They are not represented in FIGS. 5 and 6.

Registration of the Terminal $UE_1$(A) in the Network 1:

Message 1: the terminal $UE_1$ registers successfully with the entity S-CSCF (IMS network). The S-CSCF 100, in the response 200 OK to the REGISTER message, returns the URI identity of GRUU type that it has associated with this terminal. The mechanism for allocating this URI is defined in the document TS 24.229;

Message 2: the terminal $UE_1$ subscribes to the state of registration of the user (reg event package) as specified in the document TS 24.229. This subscription allows the terminal $UE_1$ to be informed of the other terminals UE registered in the network 1 and associated with the same public identity and to thus obtain their GRUU URI identities. It is assumed that at the moment the terminal $UE_1$ is the only registered terminal associated with the public identity of the user A.

Messages 3 and 4: The entity S-CSCF 100 informs the application server 110 SCC AS of the registration of the terminal $UE_1$ by sending it the information relating to this registration. This procedure is described in the document TS 24.229.

Messages 5, 6, 7 and 8: the terminal $UE_1$ publishes the presence information relating to it at the presence server SP 120. Among this information, the terminal $UE_1$ indicates that it is available and gives the types of media supported.

Registration of the Terminal $UE_2$ in the Network:

Message 9: the terminal $UE_2$ registers successfully with the entity S-CSCF 100 of the IMS architecture. The entity S-CSCF 100, in the response 200 OK to the REGISTER message, returns the URI identity of GRUU type that it has associated with this terminal.

Message 10: the terminal $UE_2$ subscribes to the state of registration of the user (reg event package) as specified in [TS 24.229]. This subscription allows the terminal $UE_2$ to be informed of the other terminals UE registered in the network 1 and associated with the same user public identity or identities and to obtain their GRUU URI identities. The terminal $UE_2$ thus obtains the item of information according to which the terminal $UE_1$ is registered in the network 1, as well as its GRUU URI identity.

Messages 11 and 12: The entity S-CSCF 100 informs the application server SCC AS 110 of the registration of the terminal $UE_2$ by sending it the information relating to this registration. This procedure is described in the document TS 24.229.

Messages 13, 14, 15 and 16: the terminal $UE_2$ publishes the presence information relating to it at the presence server SP 120. It indicates in particular that it is available and gives the types of the media that it supports.

Subscription to the Presence Information of the Other Terminals:

Messages 17, 18, 19 and 20: $UE_2$ subscribes to the presence information relating to the user A. According to a variant, it may subscribe to the presence information of the user A on the particular terminal $UE_1$, by specifying the GRUU URI identifier of $UE_1$.

Messages 21, 22, 23 and 24: the presence server SP 120 notifies the terminal $UE_2$ of the current state of the presence information relating to the terminal $UE_1$. The terminal $UE_2$ learns that $UE_1$ is available and takes cognizance of its types of media supported.

Messages 26, 27, 28 and 28: the S-CSCF 100 notifies the terminals $UE_1$ and $UE_2$ of the change of the information regarding registration of the user A subsequent to the registration of UE$_2$. The terminal UE$_1$ is therefore informed that UE$_2$ is now registered and knows its GRUU URI.

Messages 29, 30, 31, 31 and 32: The terminal UE$_1$ subscribes with the presence server SP 120 to the presence information relating to the user A on UE$_2$, identified by the GRUU URI of UE$_1$.

Messages 33, 34, 35 and 36: the presence server SP 120 notifies UE$_1$ of the current state of the presence information relating to UE$_2$. The terminal UE$_1$ learns that the terminal UE$_2$ is available and takes cognizance of its types of media supported.

The User a, by Using his Terminal UE$_1$, Establishes a Call with the User B Using UE$_3$:

Messages 37, 38, 39 and 40: The user A, via his terminal UE$_1$, sends a call destined for the user B by dispatching an INVITE request.

Messages 41, 42, 43 and 44: The terminal UE$_1$'(B) informs UE$_1$(A) that the user B has been alerted of the arrival of the call by dispatching an SIP response 180 Ringing.

Messages 45, 46, 47 and 48: The terminal UE$_1$'(B) informs UE$_1$ that the user B has accepted the call by dispatching a response 200 OK.

Messages 49, 50, 51 and 52: The terminal UE$_1$(A) acknowledges receipt of the response 200 OK by dispatching a message ACK.

Message 53: the session is established between the user A and B via their respective terminals UE$_1$ and UE$_1$'.

Messages 54, 55, 56 and 57: The terminal UE$_1$ informs the presence server SP 120 that it is now involved in a session, by specifying:

the identifier of this session. This identifier is generated by the terminal UE$_1$ and must make it possible to distinguish this session from the other sessions in which the terminal UE$_1$ might be involved. In this example, it is assumed that the terminal UE$_1$ allocates the value 1 to this session;

the public identity of the remote user: identity of B and the types of media used in this session.

Messages 58, 59, 60, 61: subsequent to the change, due to its involvement in a session, of the presence information for UE$_1$, the presence server SP 120 notifies UE$_2$ of this change. The terminal UE$_2$ learns that the terminal UE$_1$ is involved in a session with the characteristics of this session.

The User A, Via his Terminal UE$_2$, Requests the Transfer of the Entire Communication and of Control Thereof Over to the Terminal UE$_2$:

Messages 66, 67, 68, 69: subsequent to the request by the user A to transfer the entire communication with control thereof over to the terminal UE$_2$, the latter updates its presence information with the presence server so as to indicate that it desires that session number 1 be transferred to it from UE$_1$. In a variant, UE$_2$ indicates solely that it desires to be the target of a session transfer by optionally specifying its type.

Messages 70, 71, 72, 73, 74, 75, 76 and 77: subsequent to the change of the presence information relating to UE$_2$, the presence server SP 120 notifies the terminals of the user A that have subscribed to the event notification, of this change. In particular, the terminal UE$_1$ learns that UE$_2$ desires to recover session number 1 in which UE$_1$ is involved.

Transfer of the Session from UE$_1$ to UE$_2$

Messages 78, 79: the terminal UE$_1$, on receipt of the information item indicating that the terminal UE$_2$ desires to recover its session No. 1, decides to transfer this session to UE$_2$ by dispatching a REFER request to the SCC AS 110 asking it to transfer the session to UE$_2$. In such a request, the terminal UE$_2$ is identified by its GRUU URI.

Messages 80 and 81: the SCC AS 110 accepts the REFER request.

Messages 82, 83: the SCC AS 110 dispatches an INVITE request destined for the GRUU URI of the terminal UE$_2$.

Messages 84, 85: The terminal UE$_2$ accepts the establishment of this session by dispatching a message 200 OK.

Messages 86, 87: The SCC AS 110 acknowledges the response 200 OK.

Messages 88, 89: The SCC AS 110 dispatches a so-called "re-INVITE" request (INVITE request in an already established SIP dialog) to the terminal UE$_1$'(B) so as to update its session with the SDP parameters received from the terminal UE$_2$ in the message 85.

Messages 90, 92: The terminal UE$_1$' accepts the re-INVITE request.

Message 91: the media streams are established between the terminal UE$_2$(A) and the terminal UE$_1$'(B).

Messages 93, 94: The SCC AS 110 acknowledges the response 200 OK.

Messages 95, 96, 97, 98: The SCC AS 110 releases its sessions with UE$_1$.

Messages 99, 100: As specified in RFC 3515, the SCC AS 110 informs the terminal UE$_1$(A) of the success of the transfer of the session.

Figure 7:
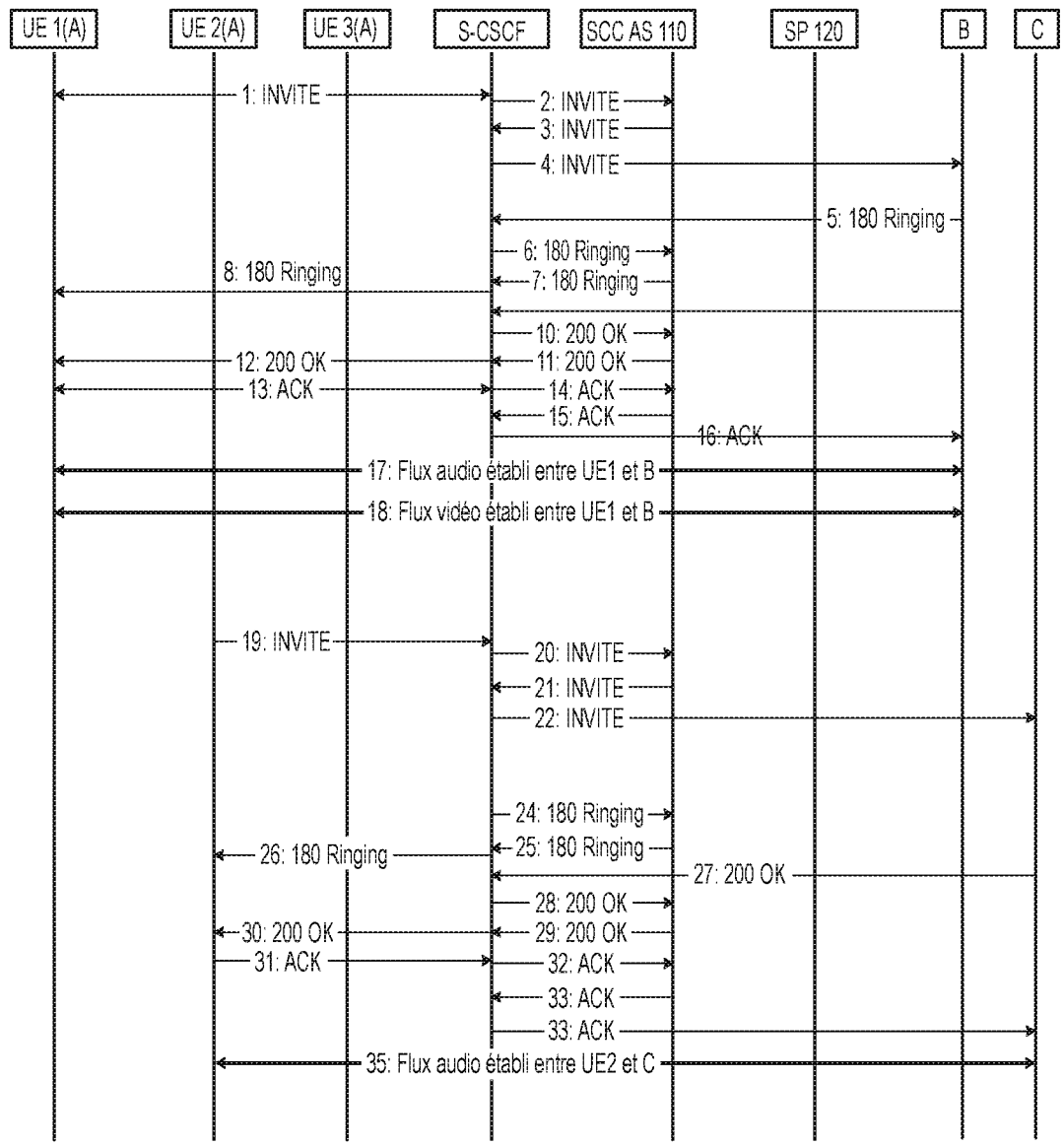
FIGS. 7 and 8 present the diagrams of the streams exchanged between the terminals of a user and the telecommunication network in a second exemplary implementation of the first embodiment of the invention.
Figure 8:
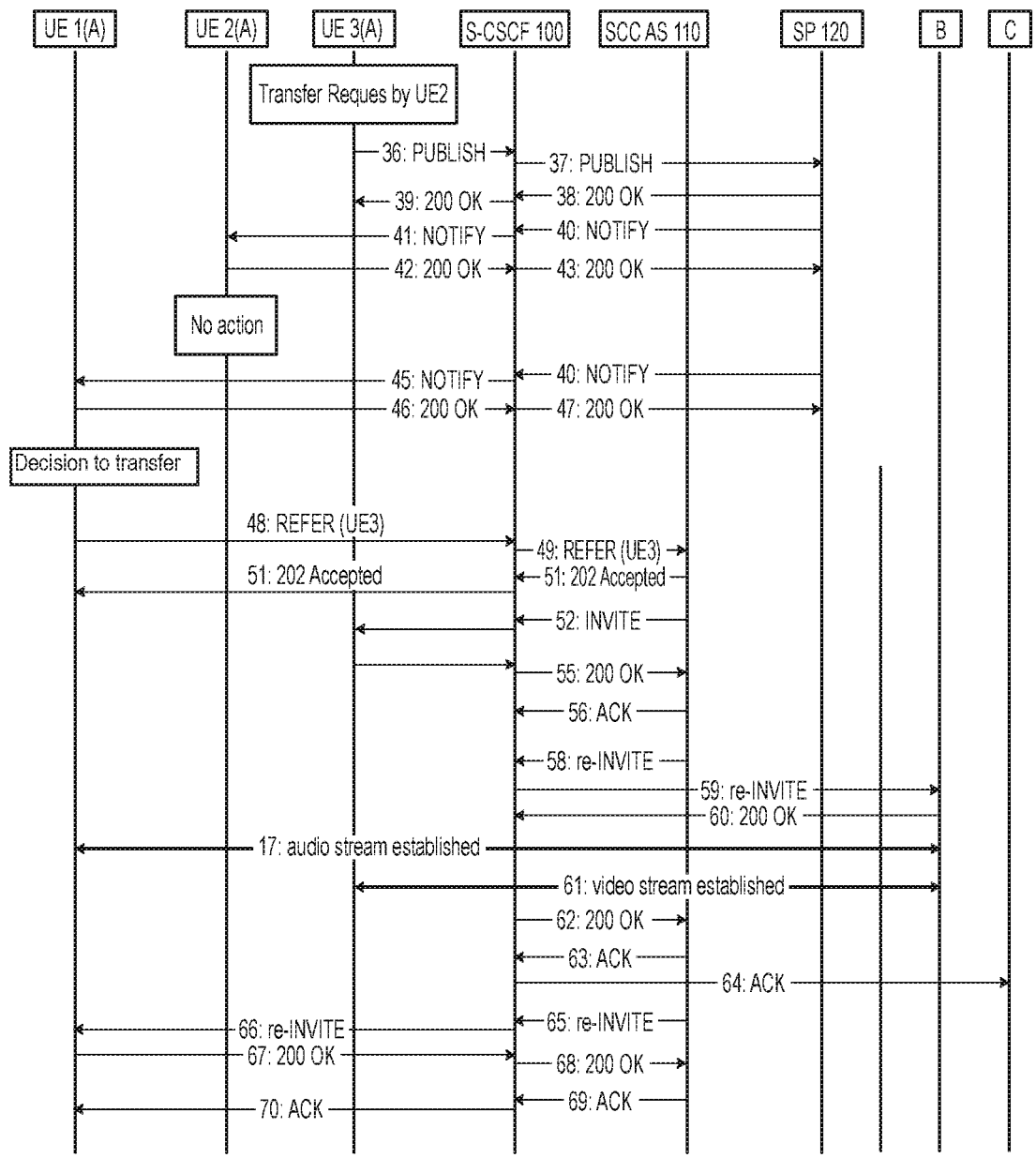

In conjunction with FIGS. 7 and 8, another exemplary implementation of the first embodiment of the invention is now presented:

The user A has three terminals UE$_1$, UE$_2$ and UE$_3$.

The user A, with his terminal UE$_1$, is in communication with another user (or a service) B. This communication uses two media: audio and video.

The user A, with his terminal UE$_2$, is in communication with another user (or a service) C. This communication uses a single medium: audio.

The user A transfers the video stream from his terminal UE$_1$ to UE$_3$ by acting on the latter. The terminal UE$_1$ retains control of the communication and the audio stream.

Registration of the Terminals UE to the Network:

Each of the terminals UE$_1$, UE$_2$ and UE$_3$ registers to the network, subscribes to the state of registration of the user (reg event package) and dispatches the presence information relating to it to the presence server, just as described in the previous example.

Subscription to the Presence Information of the Other Terminals:

Each of the terminals UE$_1$, UE$_2$ and UE$_3$ subscribes to the presence information of the other 2 terminals, each identified by their GRUU URI identifiers obtained by the subscription to the state of registration of the user, just as described in the previous example.

Messages 1, 2, 3 and 4: The user A, via his terminal UE$_1$, dispatches an INVITE request destined for B, for a session with 2 media streams, an audio stream and a video stream.

Messages 5 to 16: The establishment of the SIP session continues in a standard manner.

Messages 17, 18: the communication is established between the user A (via his terminal UE$_1$) and B with an audio stream and a video stream. It is assumed here that UE$_1$ does not provide the other terminals of A with the characteristics of the session established.

Messages 36, 37, 38, 39: subsequent to the request of the user A, UE₃ updates its presence information at the presence server by including:
- an indicator signifying that it wishes to be the target of a transfer;
- the types of media that the terminal wishes to have transferred to it, for example "video" only;
- an indicator indicating that it does not wish the control of a communication to be transferred to it.

Messages 40, 41, 42, 43, 44, 45, 46 and 47: subsequent to the change of the presence information relating to the terminal UE₃, the presence server SP 120 notifies the terminals UE₁ and UE₂ of this change, since they have previously subscribed to the presence notification of the terminal UE₃. The terminals UE₁ and UE₂ then learn that the terminal UE₃ desires to have a video stream be transferred to it without control of communication. This does not entail any action for the terminal UE₂, since it does not control any communication comprising a video stream. On the other hand, the terminal UE₁ controls a communication comprising a video stream. By taking into account the new presence information of the terminal UE₃, and by combining it with other decision criteria such as, for example, preferences (configured in the terminal UE₁) of the user and other possible parameters, the terminal UE₁ decides to initiate the transfer of the video stream, while retaining control of the communication.

Messages 48, 49: The terminal UE₁ dispatches a REFER request to the SCC AS 110 requesting to it to transfer the video stream of its communication to the terminal UE₃, UE₃ being identified by its GRUU URI. The indication that this entails only the transfer of the video stream may be, for example, accomplished by adding a parameter to the GRUU URI of the UE₃ situated in the header Refer-To.

Messages 50 and 51: the SCC AS 110 accepts the REFER request.

Messages 52, 53: the SCC AS 110 dispatches an INVITE request destined for the GRUU URI of the terminal UE₃.

Messages 54, 55: the terminal UE₃ accepts the establishment of this session by dispatching a message 200 OK.

Messages 56, 57: The SCC AS 110 acknowledges the response 200 OK.

Messages 58, 59: The SCC AS 110 dispatches a so-called "re-INVITE" request (INVITE request in an already established SIP dialog) to B so as to update the session of the user B with the SDP parameters received from UE₃ in the message 55.

Messages 60, 62: B accepts the re-INVITE request.

61: the video stream is established between the terminal UE₃(A) and B. The audio stream 17 is preserved between the terminal UE₁(A) and B.

Messages 63, 64: The SCC AS 110 acknowledges the response 200 OK.

Messages 65, 66: The SCC AS 110 dispatches a so-called "re-INVITE" request to UE₁ so as to update the session of UE₁ in order to delete the video stream (the audio stream and the control of the communication are preserved).

Messages 67, 68: the terminal UE₃ accepts this session modification by dispatching a message 200 OK.

Messages 69, 70: The SCC AS 110 acknowledges the response 200 OK.

Figure 9:
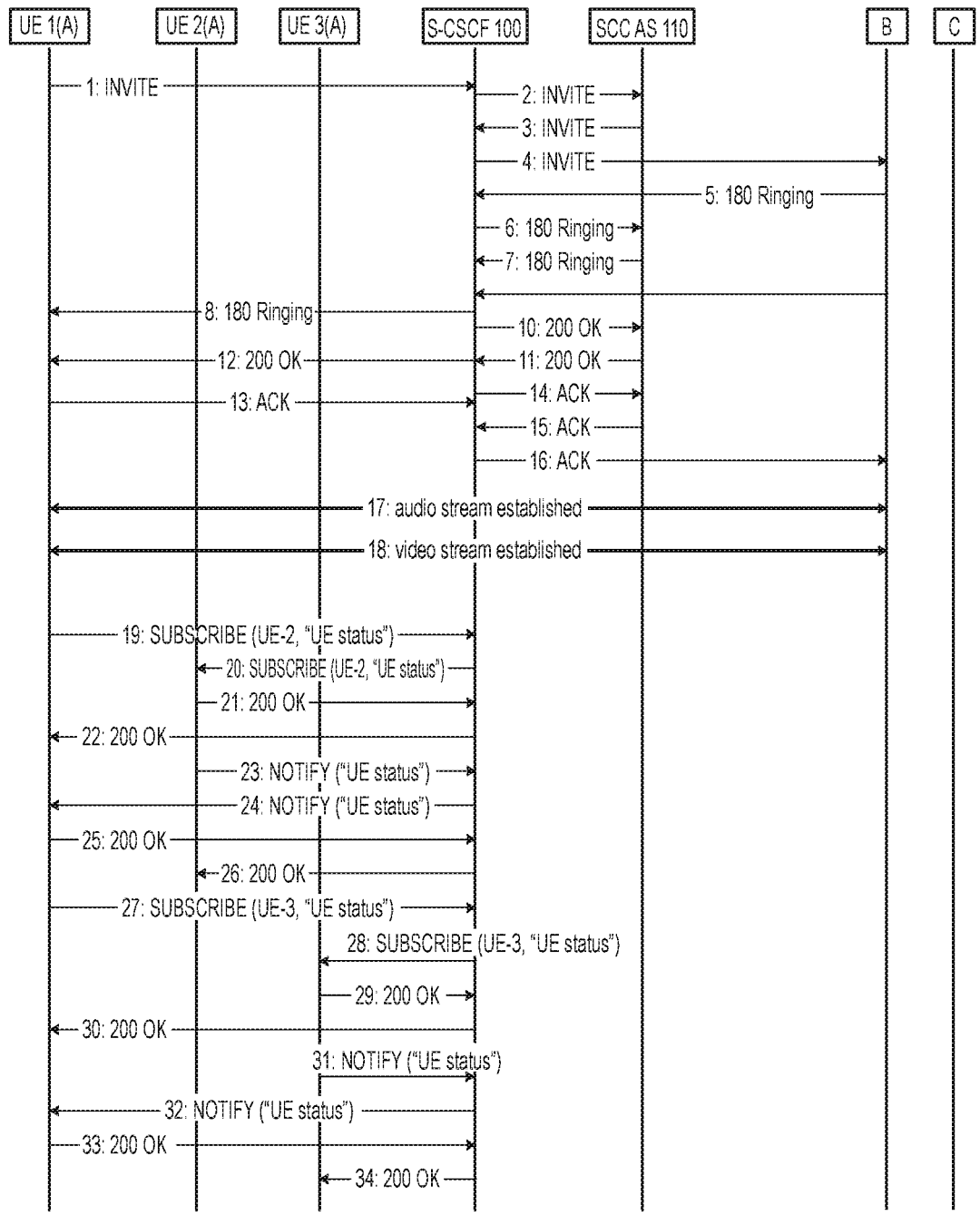
FIGS. 9, 10 and 11 present the diagrams of the streams exchanged between the terminals of a user and the telecommunication network in an exemplary implementation of the second embodiment of the invention.
Figure 10:
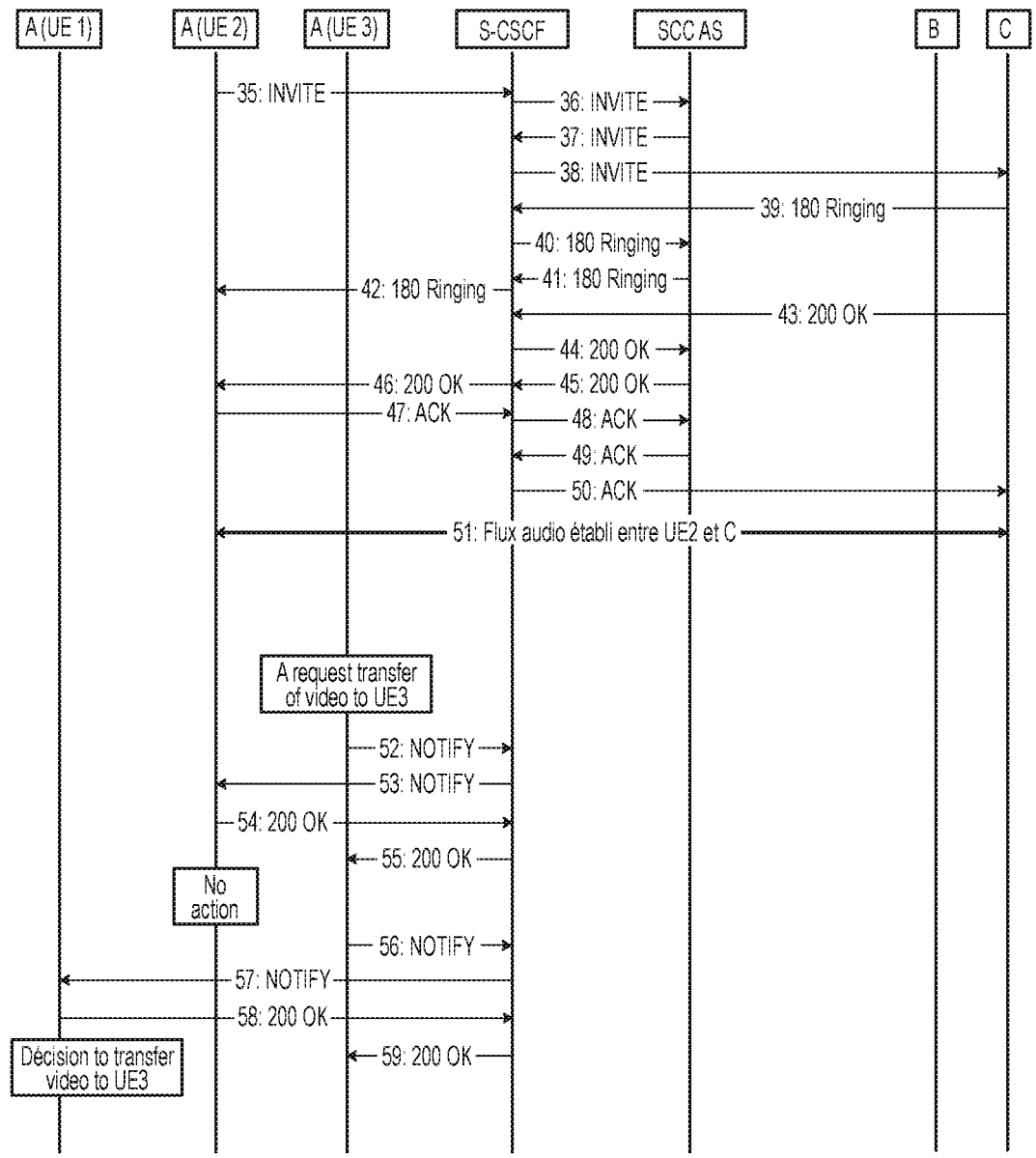
Figure 11:
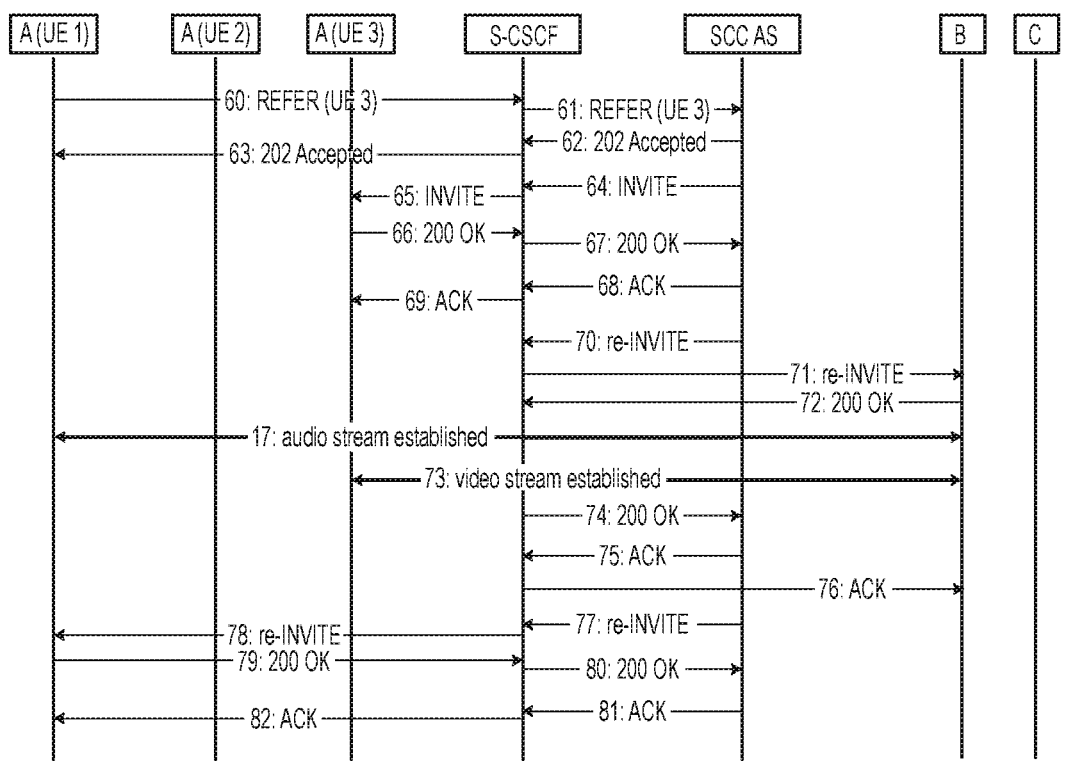

In conjunction with FIGS. 9, 10 and 11, an exemplary implementation of the second embodiment of the invention is now presented. By way of reminder, in this second embodiment, the terminals of the user do not subscribe to the notification of a presence state of the user with the presence server SP 120, but to another event notification mechanism, with each of the user's terminals. The same case of application is considered as in the example which has just been presented in conjunction with FIGS. 7 and 8:

- The user A has three terminals UE₁, UE₂ and UE₃;
- The user A, with his terminal UE₁, is in communication with another user (or a service) B. This communication uses two media: audio and video;
- The user A, with his terminal UE₂, is in communication with another user (or a service) C. This communication uses a single medium: audio;
- The user A transfers the video stream from UE₁ to UE₃ by acting on the latter. UE₁ retains control of the communication and the audio stream.

Registration of the UEs to the Network:

Each of the terminals UE₁, UE₂ and UE₃ registers to the network, subscribes to the state of registration of the user (reg event package) as described previously. On the other hand, the terminals UE₁, UE₂ and UE₃ of A do not subscribe to the presence state of the user with the presence server SP 120. Indeed, in this solution, the presence mechanism is not used.

Messages 1, 2, 3 and 4: The user A, via his terminal UE₁, dispatches an INVITE request destined for B, for a session with two media streams: audio and video.

Messages 5 to 16: The establishment of the SIP session continues in a standard manner. 17, 18: the communication is established between the user A (via his terminal UE₁) and B with an audio stream and a video stream.

NB: it is assumed here that UE₁ does not provide the other terminals of A with the characteristics of the session established.

Subscription of UE-1 to the "UE-Status Event Package" of the Other Terminals:

The terminal UE₁ subscribes to the information about the state of the other two terminals UE₂ and UE₃ of the user A, identified by their GRUU URI that it has obtained by the subscription to the state of registration of the user, as described hereinbelow:

Messages 19 to 22: The terminal UE₁ subscribes to a new type of event according to an embodiment of the invention, called "UE status", with the terminal UE₂ itself, identified by its GRUU URI. An exemplary SUBSCRIBE message dispatched by the terminal UE₁ to the terminal UE₂ is presented hereinbelow. In this example, the terminal UE₁ possesses the GRUU URI identity "sip:userA_public1@home1.net; gr=urn:uuid:f82f4fa1-72fc-1131-e2f2-10eec91e6ffff: UE₁" and the terminal UE₂ the GRUU URI identity "sip: userA_public1@home1.net; gr=urn:uuid:f81d4fae-7dec-11d0-a765-00a0c91e6bf6".

SUBSCRIBE sip:userA_public1@home1.net;gr=urn:uuid:f81d4fae-7dec-11d0-a765-00a0c91e6bf6 SIP/2.0
Via: SIP/2.0/UDP UE₁-IP-address;branch=z9hG4bK240f34.1
Max-Forwards: 70
Route: <sip:pcscf1.home1.net;lr>; <sip:scscf1.home1.net;lr>
From: <sip:userA_public1@home1.net>;tag=31415
To: <sip:userA_public1@home1.net;gr=urn:uuid:f81d4fae-7dec-11d0-a765-00a0c91e6bf6>
Call-ID: dre36d2v32gnlgiiomm72445
CSeq: 61 SUBSCRIBE
Event: UE-status
Supported:gruu -continued

```
Expires: 600000
Accept: application/UE-status-info+xml
Contact: sip:userA_public1@home1.net;gr=urn:uuid:f82f4fa1-72fc-
    1131-e2f2-10eec91e6ffff
Content-Length: 0
```

It will be noted that it is not necessary for a terminal which has no session in progress to subscribe to the "UE-status" event package.

Messages 23 to 26: the terminal $UE_2$ notifies the terminal $UE_1$ of its current state of the information of the "UE status event package". This information does not indicate that the terminal $UE_2$ wishes to be the target of a media stream transfer. Hereinbelow is an example of the NOTIFY message dispatched by $UE_2$ to $UE_1$:

```
- NOTIFY sip:userA_public1@home1.net;gr=urn:uuid:f82f4fa1-72fc-1131-
      e2f2-10eec91e6ffff SIP/2.0
- Via: SIP/2.0/UDP UE2-IP-address;branch=karfgtyuo321mofpli21.1
- Max-Forwards: 70
- Route: <sip:pcscf1.home1.net;lr>; <sip:scscf1.home1.net;lr>;
      <sip:pcscf1.home1.net;lr>
- From: <sip:userA_public1@home1.net>;tag=151170
- To: < sip:userA_public1@home1.net;gr=urn:uuid:f82f4fa1-72fc-1131-
      e2f2-10eec91e6ffff>;tag=31415
- Call-ID: dre36d2v32gnlgiiomm72445
- CSeq: 83 NOTIFY
- Subscription-State: active;expires=600000
- Event: UE-status
- Supported: gruu
- Content-Type: application/UE-status-info+xml
- Contact: sip:userA_public1@home1.net;gr=urn:uuid:f81d4fae-7dec-
      11d0-a765-00a0c91e6bf6
- Content-Length: (...)
-
- <?xml version="1.0"?>
- <UE-status-Info xmlns="urn:ietf:params:xml:ns:UE-status-Info"
-                      version="1" state="full">
-     <status> available </status>
-         <UE-capabilities>
-                 <capability> audio </capability>
-                 <capability> video </capability>
-         </UE-capabilities>
- </UE-status-Info>
```

Messages 27 to 30: the terminal $UE_1$ subscribes to the event "UE status event package" of the terminal $UE_3$, with the terminal $UE_3$ itself, identified by the GRUU URI of $UE_3$.

Messages 31 to 34: the terminal $UE_3$ notifies the terminal $UE_1$ of its current state of the information of the "UE status event package". This information does not indicate that $UE_3$ wishes to be the target of a transfer.

Establishment of a Communication Between $UE_2$ and C

A new communication, between the terminal $UE_2$ of the user A and the user or service C, with a single medium (audio), is established with the same exchanges as in the previous example, described in conjunction with FIGS. 8 and 9.

Subscription of the Terminal $UE_2$ to the "UE-Status Event Package" of the Other Terminals:

This procedure is similar to that described previously.

The User A, Via his Terminal $UE_3$, Requests the Transfer of the Video Stream from $UE_1$ to $UE_3$ In the case considered, the terminal $UE_3$ does not have any information about the sessions in progress.

It updates its "UE status" information (which is stored in the terminal $UE_3$ itself) by including:

An indicator signifying that it wishes to be the target of a transfer;

The types of media that the terminal wishes to have transferred to it, namely "video" only;

An indicator indicating that it does not wish that control of a session be transferred to it.

As a variant, the terminal $UE_3$ could have subscribed beforehand to the UE-status event package" of the other terminals $UE_1$ and $UE_2$ and could have obtained the identifiers and characteristics of the sessions in progress on the other terminals $UE_1$ and $UE_2$ of the user A.

Subsequent to this update, $UE_3$ must notify the "UE status event package" of the terminals which have subscribed with it:

Messages 52 to 55: the terminal $UE_3$ notifies the terminals $UE_2$ and $UE_1$ of the change of its "UE status" information, since the terminals $UE_2$ and $UE_1$ have previously subscribed to the "UE status event package" of $UE_3$. $UE_1$ and $UE_2$ then learn that the terminal $UE_3$ desires that a video stream be transferred to it without control of communication. This does not entail any action for the terminal $UE_2$, since $UE_2$ does not control any communication comprising a video stream. On the other hand, $UE_1$ controls a communication comprising a video stream. By taking into account the new information item about the state of the terminal $UE_3$, and by optionally combining it with other decision criteria, $UE_1$ decides to initiate the transfer of the video stream, while retaining control of the communication. An exemplary item of information dispatched in the body of the NOTIFY messages (messages 52 and 56) is presented hereinbelow:

```
- <?xml version="1.0"?>
-     <UE-status-Info
-         xmlns="urn:ietf:params:xml:ns:UE-status-Info"
-                      version="1" state="full">
-         <status> "transfer-desired" </status>
-         <Desired-transfer> media="video" control="no" </Desired-
      transfer>
-         <UE-capabilities>
-                 <capability> audio </capability>
```

-continued

```
-          <capability> video </capability>
-       </UE-capabilities>
-    </UE-status-Info>
```

Transfer of the video stream from UE₁ to UE₃: the same procedure as in the example described in conjunction with FIG. 8 is implemented.

Although the present disclosure has been described with reference to one or more examples, workers skilled in the art will recognize that changes may be made in form and detail without departing from the scope of the disclosure and/or the appended claims.

What is claimed is:

1. A method comprising:

processing, with a first controller terminal of a user of a telecommunications network, an item of information indicative of a desire of a second terminal to be the target of a transfer of at least one media stream of at least one application session in progress and/or to take control of said at least one application session, established according to the SIP protocol, said at least one application session being in progress for the user of the telecommunications network, said at least one application session being controlled only by the first controller terminal of said user, said item of information being sent by the second terminal, wherein processing comprises:

reception by the first controller terminal of a notification of an event relating to the user, comprising the at least one item of information, wherein the notification is received from a presence server of the telecommunications network subsequently to a prior subscription by the first terminal with the presence server to a mechanism for notification of events relating to a state of the user;

decision making, by the first controller terminal, relating to the desire of the second terminal to be the target of a transfer of at least one media stream of the at least one application session in progress and/or to take control of the at least one application session; and in the case of a positive decision, dispatching by the first controller terminal an involvement command to the telecommunications network, to implement the transfer of the at least one media stream to the second terminal and/or to transfer the control of the at least one application session to the second terminal.

2. The method as claimed in claim 1, wherein, subsequent to subscription to an event notification mechanism with the second terminal, the event notification is received from the second terminal.

3. A first controller terminal of a user of a telecommunications network, the first controller terminal comprising:

a non-transitory computer-readable medium comprising instructions stored thereon;

a processor configured by the instructions to perform acts of:

subscription to a mechanism for notification of an event relating to a state of the user by the first controller terminal with a presence server of the telecommunications network;

reception from the presence server of a notification of an event relating to the user, comprising at least one item of information indicative of a desire of a second terminal to be the target of a transfer of at least one media stream of at least one application session in progress and/or to take control of said at least one application session, established according to the SIP protocol, in progress for the user, said at least one application session being controlled only by the first controller terminal of said user said item of information being sent by the second terminal;

making a decision relating to the desire of the second terminal of the user to be the target of a transfer of at least one media stream of the at least one application session in progress and/or to take control of the at least one application session; and in the case of a positive decision, dispatching an involvement command to the telecommunications network, to implement the transfer of the at least one media stream to the second terminal and/or to transfer the control of the at least one application session to the second terminal.

4. A method comprising:

a second controller terminal, of a user of a telecommunications network, sending a notification of an event relating to said user to a presence server of the telecommunications network with which a first controller terminal of the user has previously subscribed to a mechanism for notification of events relating to a state of the user, the notification comprising at least one item of information indicative of a desire of the second terminal to be the target of a transfer of at least one media stream of an application session in progress and/or to take control of said at least one application session, established according to the SIP protocol, in progress for said user, said at least one application session being controlled only by a first controller terminal of said user; and the second controller terminal subsequently receiving the transfer of the at least one media stream of the at least one application session and/or taking control of the at least one application session, wherein said event notification is published at the presence server, which is configured to transmit the event notification to terminals of the user having previously subscribed thereto.

5. The method as claimed in claim 4, wherein, subsequent to prior reception of a request for subscription to a mechanism for notification of an event relating to a state of said user by the first controller terminal with the second controller terminal, the event notification is dispatched to said first controller terminal.

6. The method as claimed in claim 4, wherein the method comprises:

obtaining information comprising a list of identifiers of application sessions in progress between said user and the network and wherein the sending an item of information indicative of a level of involvement desired by the second controller terminal comprises the identifier of the targeted application session.

7. A device implemented by a second controller terminal of a user of a telecommunications network, the device comprising:

a non-transitory computer-readable medium comprising instructions stored thereon;

a processor configured by the instructions to perform acts of:

sending an event notification of an event relating to said user to a presence server of the telecommunications network with which a first controller terminal of the user has previously subscribed to a mechanism for notification of events relating to a state of the user, the event notification comprising at least one item of information indicative of a desire of the second controller terminal to be the target of a transfer of at least one media stream of at least one application session in progress and/or to take control of the at least one application session, which is established according to the SIP protocol, in progress for said user, said at least one application session being controlled only by the first controller terminal of said user; and the second controller terminal subsequently receiving the transfer of the at least one media stream and/or taking control of the at least one application session.

8. A first terminal of a user of a telecommunications network, wherein the first terminal comprises:
   a non-transitory computer-readable medium comprising instructions stored thereon;
   a processor configured by the instructions to perform acts of:
   subscribing to a mechanism for notification of an event relating to a state of the user by the first terminal with a presence server of the telecommunications network;
   processing an item of information indicative of a desire of a second terminal of said user to be the target of a transfer of at least one media stream of at least one application session in progress and/or to take control of the at least one application session, which is controlled only by the first terminal of said user, is established according to the SIP protocol and is in progress between the user and said telecommunications network, said item of information being sent by the second terminal, wherein processing comprises:
      reception from said presence server by the first terminal of a notification of an event relating to the user, comprising the at least one item of information;
      making a decision by the first terminal relating to the desire of the second terminal to be the target of a transfer of the at least one media stream of the at least one application session in progress and/or to take control of the at least one application session; and
      in the case of a positive decision, dispatching an involvement command by the first terminal to the telecommunications network, to implement the transfer of the at least one media stream of the at least one application session to the second terminal and/or to transfer the control of the at least one application session to the second terminal; and
   sending an event notification comprising at least one item of information indicative of a level of involvement desired by the first terminal in at least one further application session in progress.

9. A presence server in a telecommunications network, comprising:
   a non-transitory computer-readable medium comprising instructions stored thereon;
   a processor configured by the instructions to perform acts of:
   receiving a request from a first terminal of a user registered in the network for subscription to a mechanism for notification of events relating to a state of the user and recording the request for subscription to subscribe the first terminal;
   receiving information relating to the user and published by a second terminal of the user registered in the network, the information indicating a desire of the second terminal to be the target of a transfer of at least one media stream of at least one application session in progress and/or to take control of the at least one application session, established according to the SIP protocol, in progress between the first terminal of the user and the telecommunications network,
   storing said information; and
   sending a notification of an event to the first terminal comprising the information, said at least one application session being controlled only by the first controller terminal of said user.

10. A non-transitory computer-readable medium comprising a computer program stored thereon and executable by a microprocessor, wherein the product comprises program code instructions for execution of a method by a first terminal of a user, wherein the method comprises:
    processing an item of information indicative of a desire of a second terminal of the user to be the target of a transfer of at least one media stream of at least one application session in progress and/or to take control of the at least one application session, established according to the SIP protocol, in progress for a user of a telecommunications network, said at least one application session being controlled only by the first terminal of said user, said item of information being sent by the second terminal, wherein processing comprises:
       reception by the first controller terminal of a notification of an event relating to the user, comprising the item of information, wherein the notification is received from a presence server of the telecommunications network subsequently to a prior subscription by the first terminal with the presence server to a mechanism for notification of events relating to a state of the user;
       making a decision by the first controller terminal relating to the desire of a second terminal of the user to be the target of a transfer of at least one media stream of the at least one application session in progress and/or to take control of the at least one application session; and
       in the case of a positive decision, dispatching an involvement command by the first controller terminal to the telecommunications network, to implement the transfer of the at least one media stream of the at least one application session to the second terminal and/or to transfer the control of the at least one application session to the second terminal.

11. A non-transitory computer-readable medium comprising a computer program product stored thereon and executable by a microprocessor, wherein the product comprises program code instructions for execution of a method, wherein said method, implemented by a second terminal of a user of a telecommunications network, comprises:
    the second terminal of said user sending a notification of an event relating to said user to a presence server of the telecommunications network with which a first terminal of the user has previously subscribed to a mechanism for notification of events relating to a state of the user, the notification comprising at least one item of information indicative of a desire of the second terminal to be the target of a transfer of at least one media stream of at least one application session in progress and/or to take control of the at least one application session, the at least one application session being established according to the SIP protocol and in progress for said user, said at least one application session being controlled only by a first controller terminal of said user; and the second control terminal subsequently receiving the transfer of the at least one media stream and/or taking control of the at least one application session.

\* \* \* \* \*